United States Patent
McKeon

(10) Patent No.: US 12,528,258 B2
(45) Date of Patent: Jan. 20, 2026

(54) MANUFACTURING FIBER-REINFORCED COMPOSITE BODY WITH MULTIPLE LAMINATED LAYERS

(71) Applicant: Raytheon Technologies Corporation, Farmington, CT (US)

(72) Inventor: Michael McKeon, Ellington, CT (US)

(73) Assignee: RTX Corporation, Farmington, CT (US)

( * ) Notice: Subject to any disclaimer, the term of this patent is extended or adjusted under 35 U.S.C. 154(b) by 139 days.

(21) Appl. No.: 18/202,760

(22) Filed: May 26, 2023

(65) Prior Publication Data
US 2024/0391183 A1    Nov. 28, 2024

(51) Int. Cl.
*B29C 70/22* (2006.01)
*B29C 70/30* (2006.01)
*B29C 70/54* (2006.01)
*B29L 31/30* (2006.01)

(52) U.S. Cl.
CPC .............. *B29C 70/22* (2013.01); *B29C 70/30* (2013.01); *B29C 70/54* (2013.01); *B29C 2793/0081* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 5,783,278 A | 7/1998 | Nishimura | |
| 9,969,131 B2 | 5/2018 | Samak Sangari | |
| 11,155,048 B2 | 10/2021 | Carlson | |
| 11,618,248 B2 | 4/2023 | Brockschmidt | |
| 2020/0047879 A1 * | 2/2020 | Foskey | B64C 27/473 |
| 2023/0323054 A1 * | 10/2023 | Burnell | B32B 5/263 |
| | | | 264/136 |

FOREIGN PATENT DOCUMENTS

| | | | |
|---|---|---|---|
| GB | 2268705 B | 1/1996 | |
| JP | WO9627701 A1 * | 9/1996 | B29C 70/22 |
| WO | 2021069835 A1 | 4/2021 | |

OTHER PUBLICATIONS

Nishimura WO9627701A1 English Translation 1996 (Year: 1996).*
EP Search Report for EP Patent Application No. 24178048.5 dated Oct. 14, 2024.
"Woven Fabrics: The Basics", https://www.compositesworld.com/articles/woven-fabrics-the-basics, Feb. 20, 2020.

* cited by examiner

*Primary Examiner* — Jacob T Minskey
*Assistant Examiner* — Adrien J Bernard
(74) *Attorney, Agent, or Firm* — Getz Balich LLC

(57) ABSTRACT

A method is provided for manufacturing an object. This method includes: arranging a first portion of a fabric over a tool; cutting out a section of the first portion of the fabric to provide a first ply, and disposing the first ply on the tool; arranging a second portion of the fabric over the tool; cutting out a section of the second portion of the fabric to provide a second ply, and stacking the second ply on the first ply; and consolidating a laminate stack on the tool to form the object, the laminate stack including the first ply, the second ply and a polymer matrix impregnating the first ply and the second ply.

19 Claims, 17 Drawing Sheets

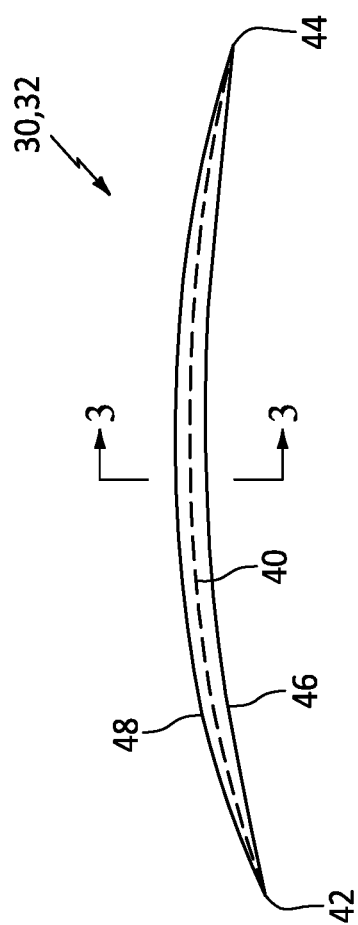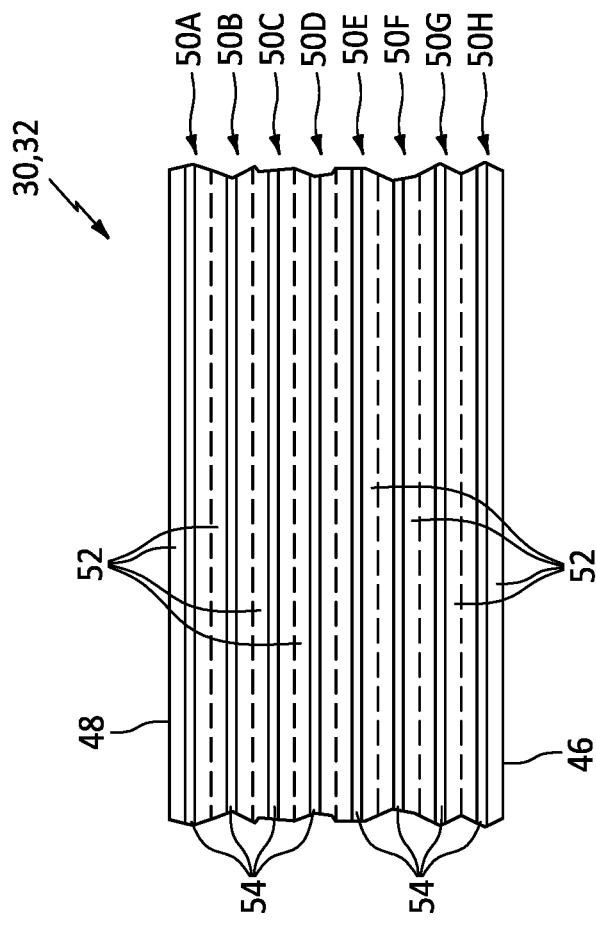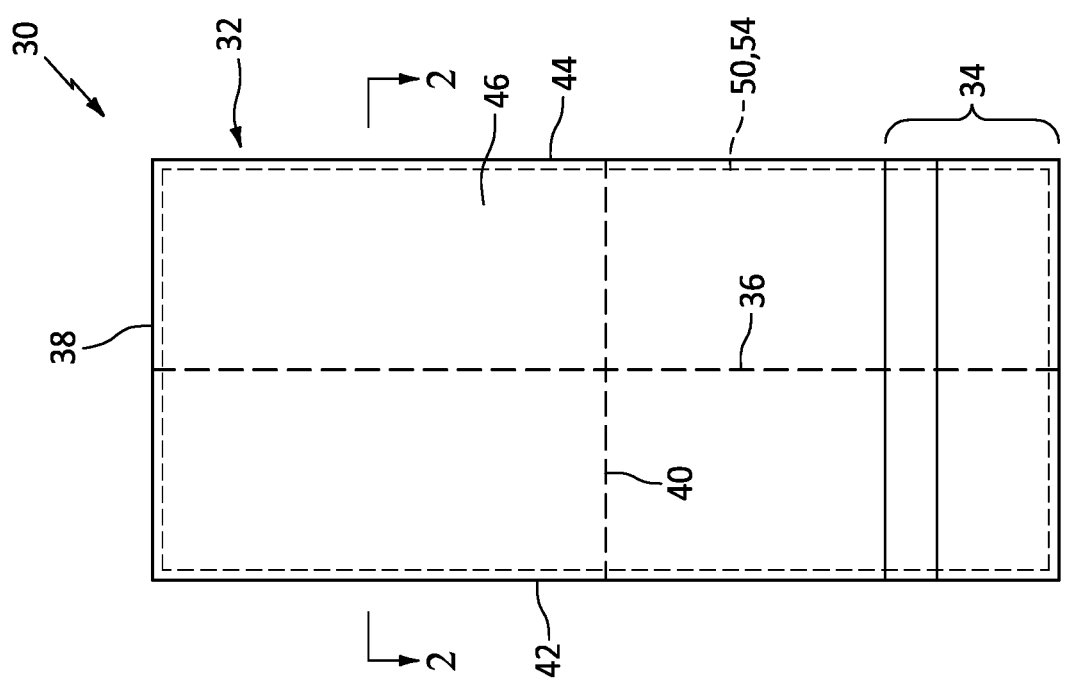

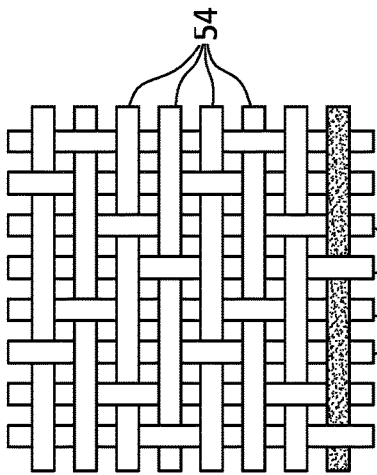
*FIG. 4A*
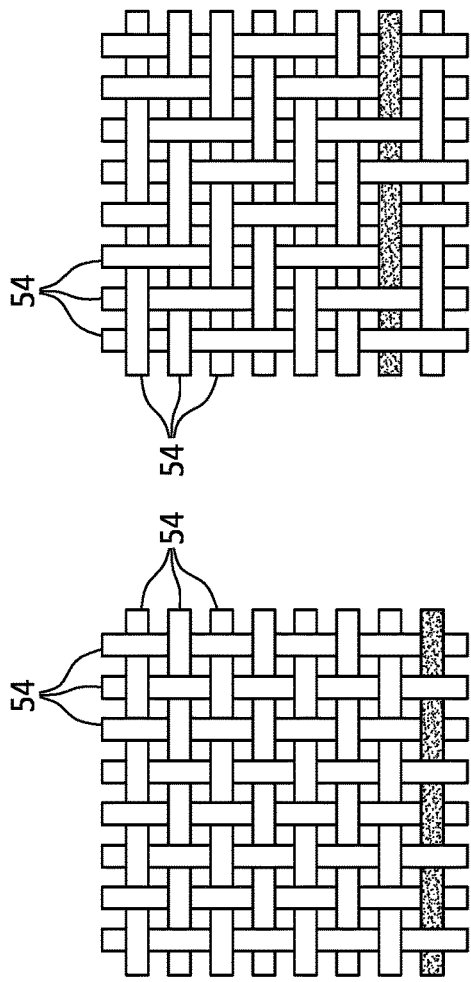
*FIG. 4B*
*FIG. 4C*
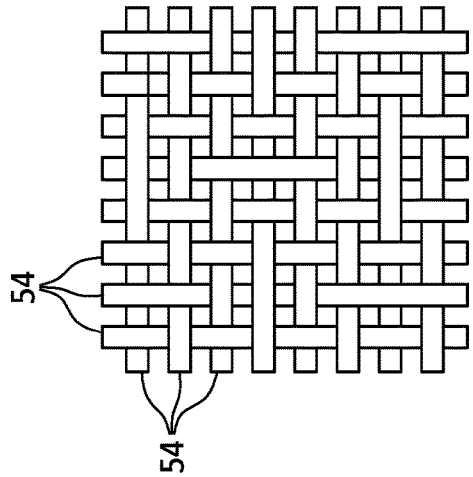
*FIG. 4D*
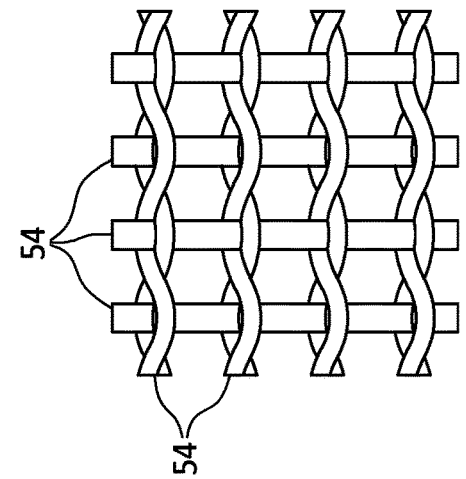
*FIG. 4E*
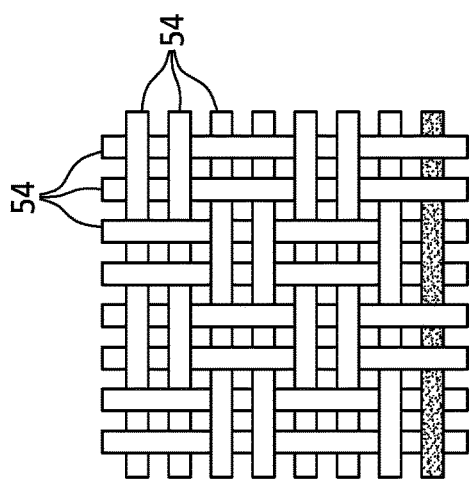
*FIG. 4F*

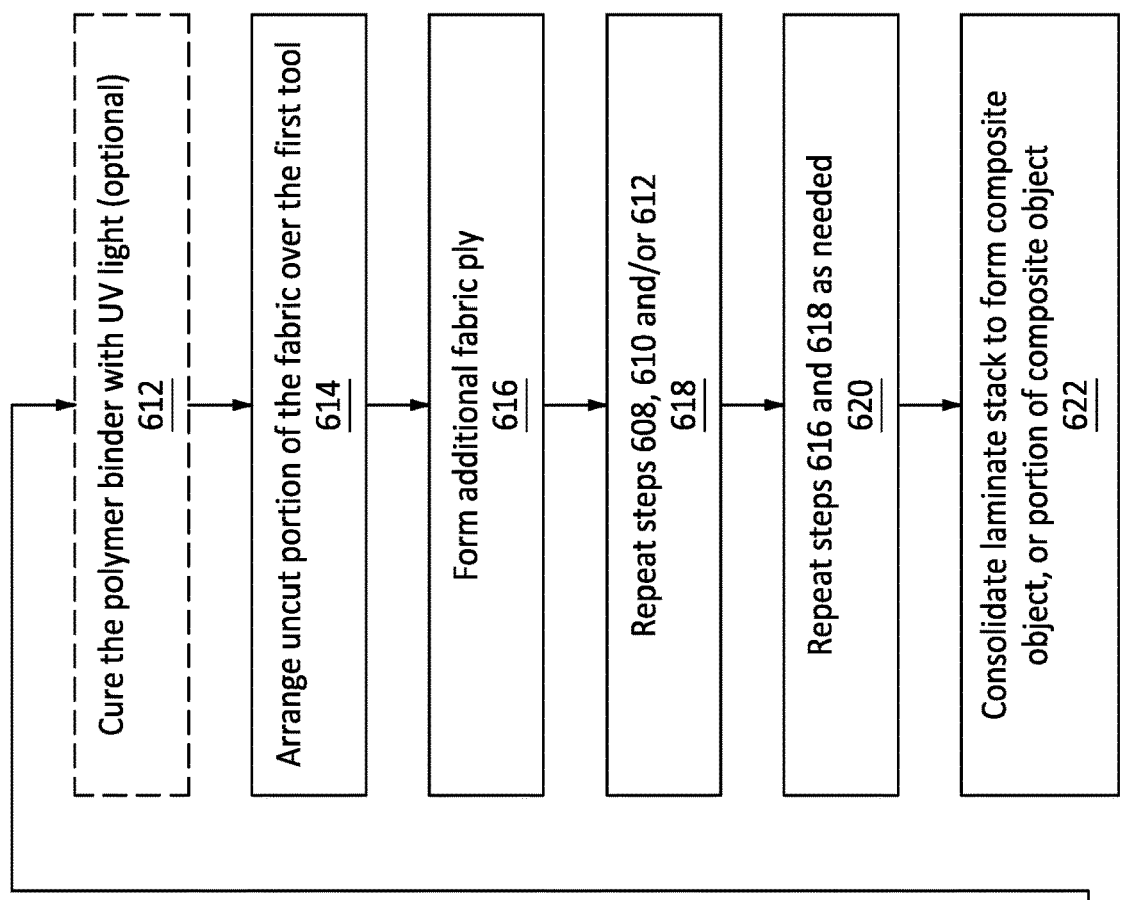
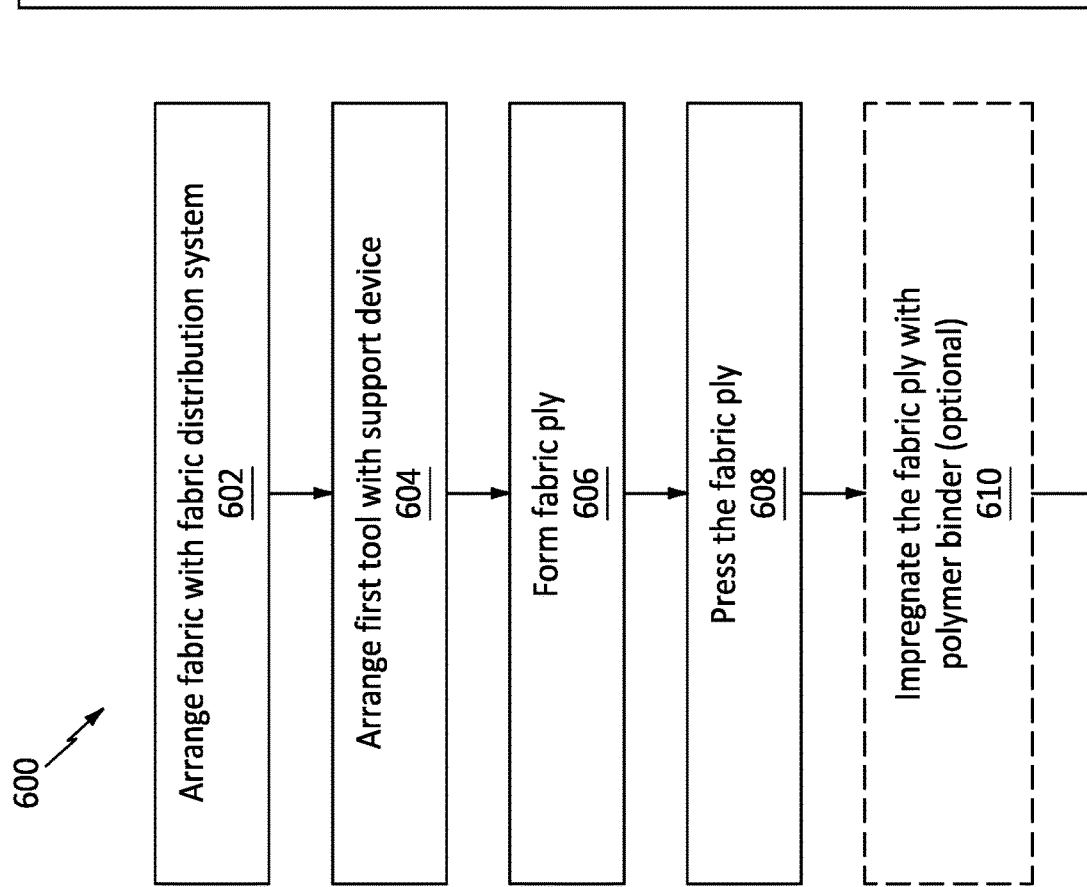
FIG. 6

MANUFACTURING FIBER-REINFORCED COMPOSITE BODY WITH MULTIPLE LAMINATED LAYERS

BACKGROUND OF THE DISCLOSURE

1. Technical Field

This disclosure relates generally to manufacturing and, more particularly, to manufacturing a fiber-reinforced composite body.

2. Background Information

Various methods are known in the art for manufacturing a fiber-reinforced composite body. These methods include automated tape laying and automated fiber placement. While these known manufacturing methods have various advantages, there is still room in the art for improvement.

SUMMARY OF THE DISCLOSURE

According to an aspect of the present disclosure, a method is provided for manufacturing an object. This method includes: arranging a first portion of a fabric over a tool; cutting out a section of the first portion of the fabric to provide a first ply, and disposing the first ply on the tool; arranging a second portion of the fabric over the tool; cutting out a section of the second portion of the fabric to provide a second ply, and stacking the second ply on the first ply; and consolidating a laminate stack on the tool to form the object, the laminate stack including the first ply, the second ply and a polymer matrix impregnating the first ply and the second ply.

According to another aspect of the present disclosure, another method is provided for manufacturing an object. This method includes: disposing a first portion of a fabric over a tool; cutting the first portion of the fabric to leave a first ply of the fabric on the tool; disposing a second portion of the fabric over the first ply of the fabric by moving a remnant of the first portion of the fabric following the cutting of the first portion of the fabric; cutting the second portion of the fabric to leave a second ply of the fabric on the first ply of the fabric; and consolidating a laminate stack on the tool, the laminate stack including the first ply of the fabric, the second ply of the fabric and a polymer matrix.

According to still another aspect of the present disclosure, another method is provided for manufacturing an object. This method includes: pulling a fabric off of a supply roll and over a tool; cutting the fabric using a robotic manipulator to leave a first ply of the fabric on the tool; further pulling the fabric off of the supply roll and over the first ply; cutting the fabric using the robotic manipulator to leave a second ply of the fabric on the first ply of the fabric; and consolidating a laminate stack, the laminate stack including the first ply of the fabric, the second ply of the fabric and a polymer matrix.

The method may also include: drawing the first portion of the fabric and the second portion of the fabric from a supply roll of the fabric; and rolling up the remnant of the first portion of the fabric onto a remnant roll of the fabric.

The section cut out of the first portion of the fabric may be an interior section of the first portion of the fabric.

The method may also include: impregnating the first ply with the polymer matrix following the cutting out of the section of the first portion of the fabric; and impregnating the second ply with the polymer matrix following the cutting out of the section of the second portion of the fabric.

The fabric may be or otherwise include a prepreg fabric. The prepreg fabric may include fiber-reinforcement impregnated with the polymer matrix.

The polymer matrix may be or otherwise include a thermoset matrix.

The polymer matrix may be or otherwise include a thermoplastic matrix.

The arranging of the first portion of the fabric may include pulling the first portion of the fabric over the tool.

The method may also include unrolling the fabric from a roll of the fabric during the pulling the first portion of the fabric over the tool.

The method may also include rolling up a remnant of the fabric during the pulling the first portion of the fabric over the tool. The first portion of the fabric may be located between the remnant of the fabric and the second portion of the fabric.

The method may also include removing a backer from the fabric during the pulling of the first portion of the fabric over the tool.

The method may also include forming the fabric upstream of the tool along a manufacturing line. The forming of the fabric may include weaving fibers together.

The section of the first portion of the fabric may be cut out using a knife attached to a robotic manipulator.

The section of the first portion of the fabric may be cut out using an energy beam.

The method may also include pressing the first ply against the tool.

The method may also include re-orienting the tool following the disposing of the first ply on the tool and before the cutting out of the section of the second portion of the fabric.

The method may also include pressing the laminate stack between the tool and a second tool.

The object may be configured as a component for an aircraft.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1 is a schematic illustration of a fiber-reinforced composite rotor blade.

FIG. 2 is a cross-sectional schematic illustration of the rotor blade taken along line 2-2 in FIG. 1.

FIG. 3 is a sectional schematic illustration of the rotor blade taken along line 3-3 in FIG. 2.

FIGS. 4A-G are partial illustrations of various fiber patterns.

FIG. 6 is a flow diagram of a method for manufacturing a composite object such as the rotor blade.

DETAILED DESCRIPTION

Figure 4G:
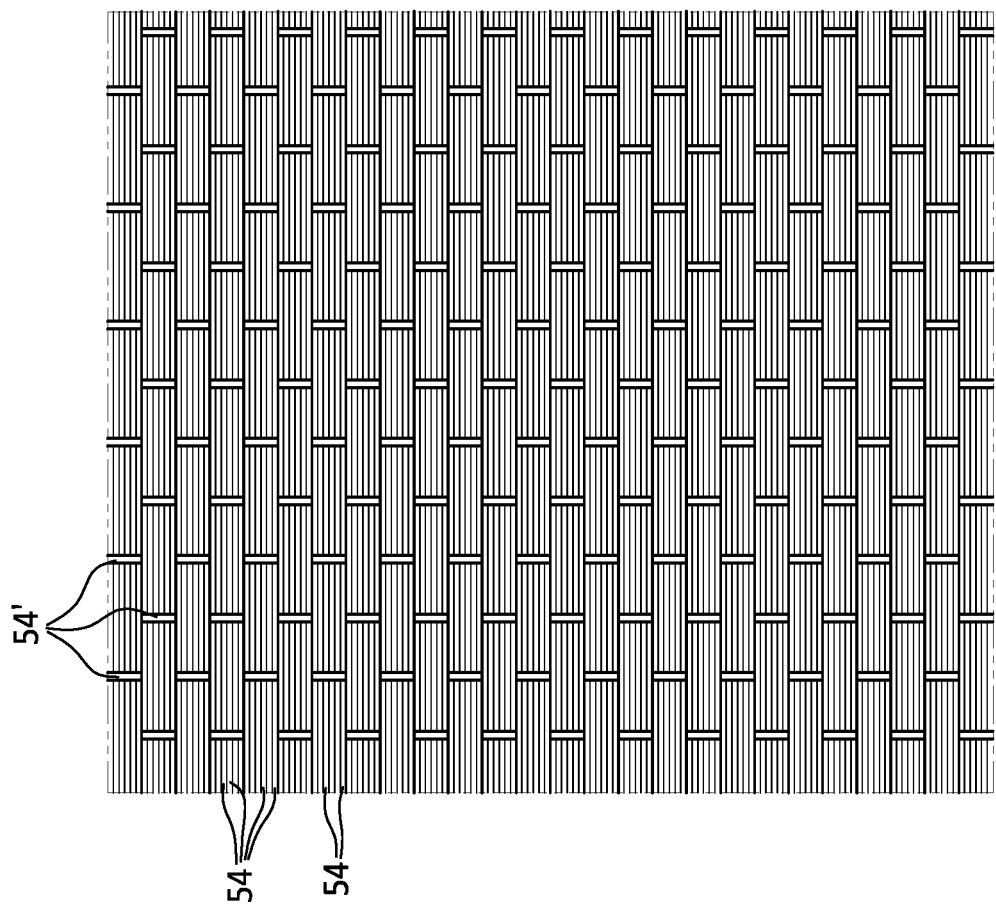

The present disclosure includes systems and methods for manufacturing a fiber reinforced composite object. This composite object may be configured as a component of a propulsion system for an aircraft. The composite object, for example, may be configured as a rotor blade or a stator vane. Examples of the rotor blade include a fan blade and an open rotor propulsor blade. Examples of the stator vane include an inlet guide vane and an exit guide vane. In another example, the composite object may be configured as or included as part of a structural support such as a strut, a frame or an engine case. In another example, the composite object may be configured as or included as part of a component of a nacelle housing an engine of the aircraft propulsion system. Examples of the nacelle component include a liner, a nacelle barrel or a cowl. The composite object of the present disclosure, however, is not limited to aircraft propulsion system applications. The composite object, for example, may alternatively be configured as or included as part of another component for the aircraft; e.g., a component of a wing or a fuselage. Moreover, the systems and methods of the present disclosure may also manufacture composite objects for non-aircraft applications. However, for ease of description, the composite object may be described below as an aircraft component such as a rotor blade.

FIG. 1 illustrates an example of the composite object configured as a rotor blade 30; e.g., a propulsor blade such as a fan blade. This rotor blade 30 includes an airfoil 32 and a base 34 (e.g., a root, an attachment, etc.) for attaching the rotor blade 30 to a rotor disk or hub. The airfoil 32 is connected to the base 34. The airfoil 32 projects spanwise out from the base 34 along a span line 36 of the rotor blade 30 to a tip 38 of the airfoil 32. The airfoil 32 extends longitudinally along a camber line 40 of the airfoil 32 from a leading edge 42 of the airfoil 32 to a trailing edge 44 of the airfoil 32. Referring to FIG. 2, the airfoil 32 has a thickness extending laterally between opposing sides 46 and 48 of the airfoil 32. The first side 46 may be a concave (e.g., pressure) side of the airfoil 32, and the second side 48 may be a convex (e.g., suction) side of the airfoil 32.

Referring to FIG. 3, the rotor blade 30 and its airfoil 32 are configured as a consolidated laminate. The rotor blade 30 of FIG. 3 and its airfoil 32, for example, are formed from a plurality of fused layers 50A-H (generally referred to as "50") of material. Each of these layers 50 of material includes fiber-reinforcement and a polymer matrix 52. The fiber-reinforcement includes a plurality of fibers 54 such as fiberglass fibers, carbon fibers and/or aramid (e.g., Kevlar®) fibers. The fibers 54 within each layer 50 may be woven together into a (e.g., two-dimensional (2D)) weave such as a plain weave (see FIG. 4A), a twill weave (see FIG. 4B), a satin weave (see FIG. 4C), a basket weave (see FIG. 4D), a leno weave (see FIG. 4E) or a mock leno weave (see FIG. 4F). Alternatively, the fibers 54 within one or more or all of the layers 50 may be non-woven (see FIG. 4G); e.g., unidirectional. In some embodiments, the unidirectional fibers 54 may be held together by light, non-structural weft fibers 54'. Referring again to FIG. 3, the woven fibers 54 are embedded within the polymer matrix 52. The polymer matrix 52 may thereby form a matrix about the fiber-reinforcement. The polymer matrix 52 may be a thermoset matrix or thermoplastic matrix. Examples of the thermoset matrix include, but are not limited to, Hexply® M78, Hexply® M91, polyvinyl acetate (PVA), polyvinyl butyral (PVB), UVECOAT®, etc. Examples of the thermoplastic matrix include, but are not limited to, nylon, polyether ether ketone (PEEK), polyether ketone ketone (PEKK), acrylonitrile butadiene styrene (ABS), polycarbonate (PC), etc. The polymer matrix 52 may be pre-impregnated or added at a subsequent operation as described below in further detail.

Referring to FIG. 1, the weave of fibers 54 in one or more or all of the layers 50 may extend continuously (e.g., uninterrupted) between and to (e.g., all) opposing ends of the respective layer 50. The weave of fibers 54 in the layer 50 of FIG. 1, for example, extends longitudinally between and to (or about) the leading edge 42 and the trailing edge 44. This weave of fibers 54 also extends spanwise through the base 34 and the airfoil 32 to (or about) the tip 38. Providing such a continuous weave of fibers 54 longitudinally and spanwise across the rotor blade 30 may increase rotor blade strength compared to, for example, other arrangements with multiple different weaves of fibers (e.g., plies of fiber tape) disposed side-by-side next to one another and/or slightly overlapping one another within the same layer. For example, resin filled gaps between adjacent weaves and/or slight overlaps between adjacent weaves within a layer may impart weak points in that layer.

Figure 5:
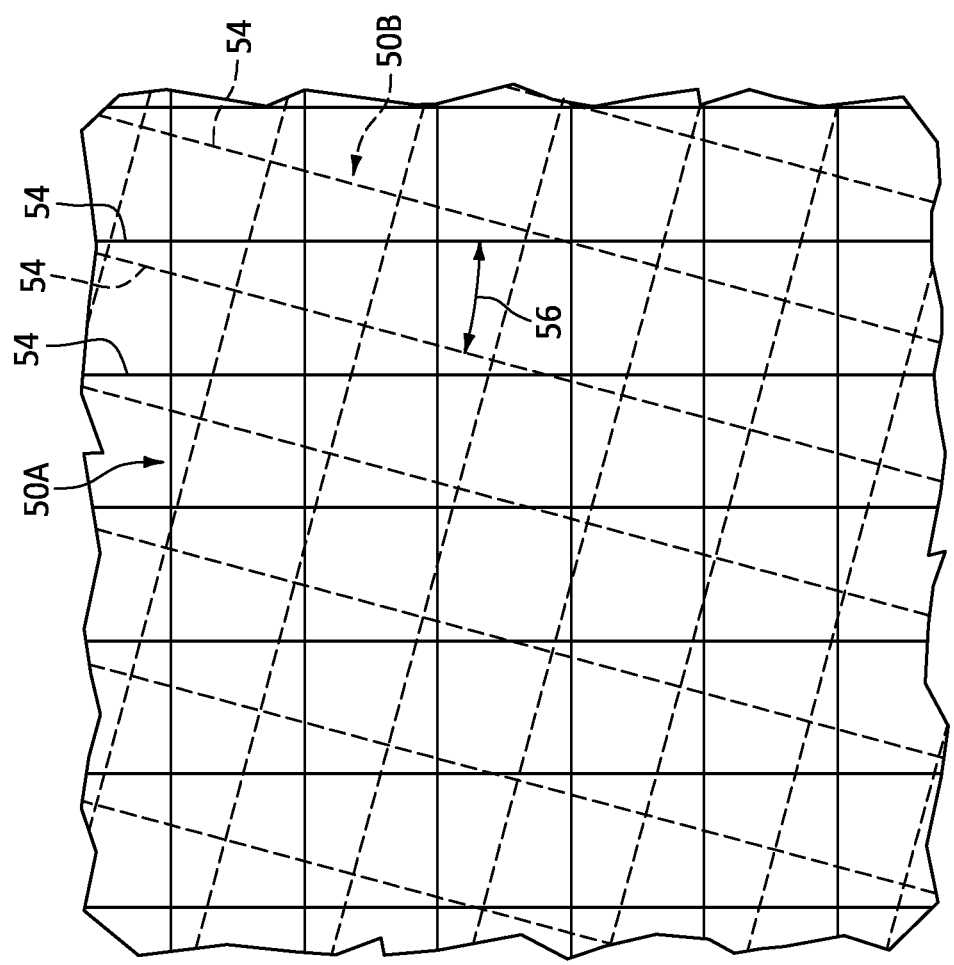
FIG. 5 is a partial illustration of a first fiber weave superimposed over a second fiber weave with a different orientation.

To further strengthen the rotor blade 30, the weaves of fibers 54 in different layers 50 may have different fiber orientations. For example, referring to FIG. 5, the fibers 54 in the weave in a first layer 50A may be angularly offset to the fibers 54 in the weave in a (e.g., adjacent) second layer 50B. The fibers 54 in the first layer 50A of FIG. 5, in particular, are angularly offset from the fibers 54 in the second layer 50B by an included angle 56; e.g., an acute angle. Of course, in other layers 50, the weaves of fibers 54 may have common (the same) fiber orientations.

FIG. 6 is a flow diagram of a method 600 for manufacturing a composite object such as the rotor blade 30 of FIGS. 1-5. For ease of description, the manufacturing method 600 is described below with reference to the manufacturing system of FIGS. 7-20. The manufacturing method 600 of the present disclosure, however, is not limited to utilizing such an exemplary manufacturing system. Moreover, the manufacturing method 600 may also be utilized to manufacture various fiber reinforced composite objects other than the rotor blade 30 of FIGS. 1-5.

Figure 7:
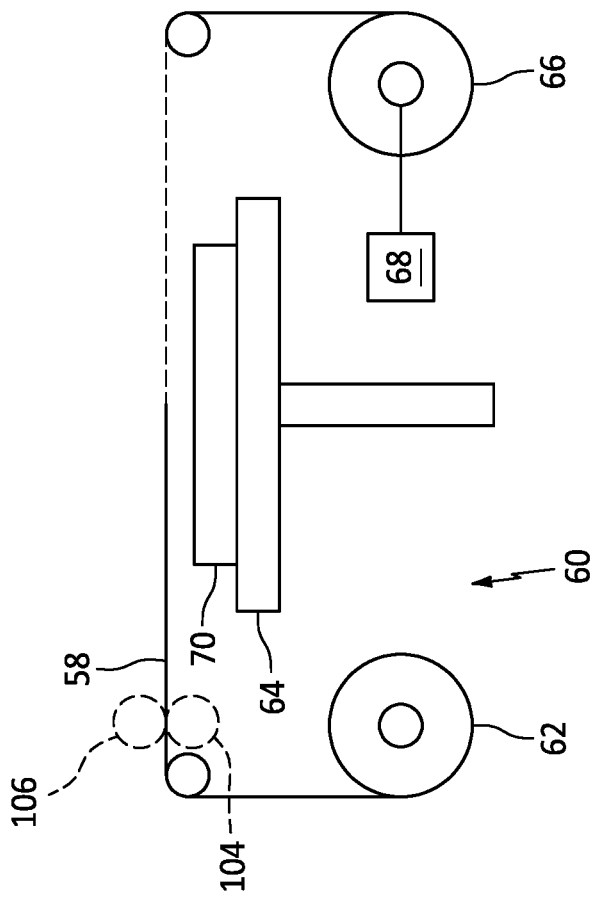
FIG. 7 is a partial schematic illustration of a manufacturing system with a fabric distribution system.

In step 602, referring to FIG. 7, a length of fabric 58 is arranged with a fabric distribution system 60 of the manufacturing system. This fabric 58 may be a source for the weave of fibers 54 (e.g., piece of fabric) in some or all of the rotor blade layers 50; see FIGS. 3-5. The fabric 58 includes the fiber-reinforcement fibers 54, which fibers 54 are woven into a continuous weave of the fibers 54; e.g., one of the weaves in FIGS. 4A-F. The fabric 58 may be a dry fabric where the fabric 58 has not yet been impregnated with the polymer matrix 52. Alternatively, the fabric 58 may be a prepreg fabric where the fabric 58 has been at least partially or fully pre-impregnated with the polymer matrix 52.

The fabric 58 may be received in a supply roll 62; e.g., a fabric bolt. To arrange the fabric 58 with the fabric distribution system 60, the supply roll 62 of the fabric 58 is rotatably mounted at (e.g., on, adjacent or proximate) a first side of a support device 64; e.g., a platform, a fixture, etc. The fabric 58 is partially unrolled from the supply roll 62 and pulled over and across the support device 64. A free end of the fabric 58 may then be attached to a remnant roll 66, which remnant roll 66 is rotatably mounted at a second side of the support device 64. The remnant roll 66 of FIG. 7 is operatively coupled to an actuator 68; e.g., an electric motor. This actuator 68 may rotate the remnant roll 66 to roll up an initial portion of the fabric 58 onto the remnant roll 66. Here, the rolling up of the fabric 58 onto the remnant roll 66 also pulls the fabric 58 along the support device 64 and pulls the fabric 58 off of the supply roll 62. It is contemplated, however, the fabric distribution system 60 may also or alternatively include one or more other actuators to facilitate the movement of the fabric 58 along the support device 64 and/or the unrolling of the fabric 58 from the supply roll 62.

In step 604, a first tool 70 is arranged with the support device 64. This first tool 70 may be configured as a mold for forming the rotor blade 30. The first tool 70 of FIG. 7, for example, is configured as a bottom mold section; e.g., a bottom mold half. The first tool 70 is disposed on and may be fixed to the support device 64. With this arrangement, the fabric 58 is disposed over and extends across the first tool 70.

Figure 8:
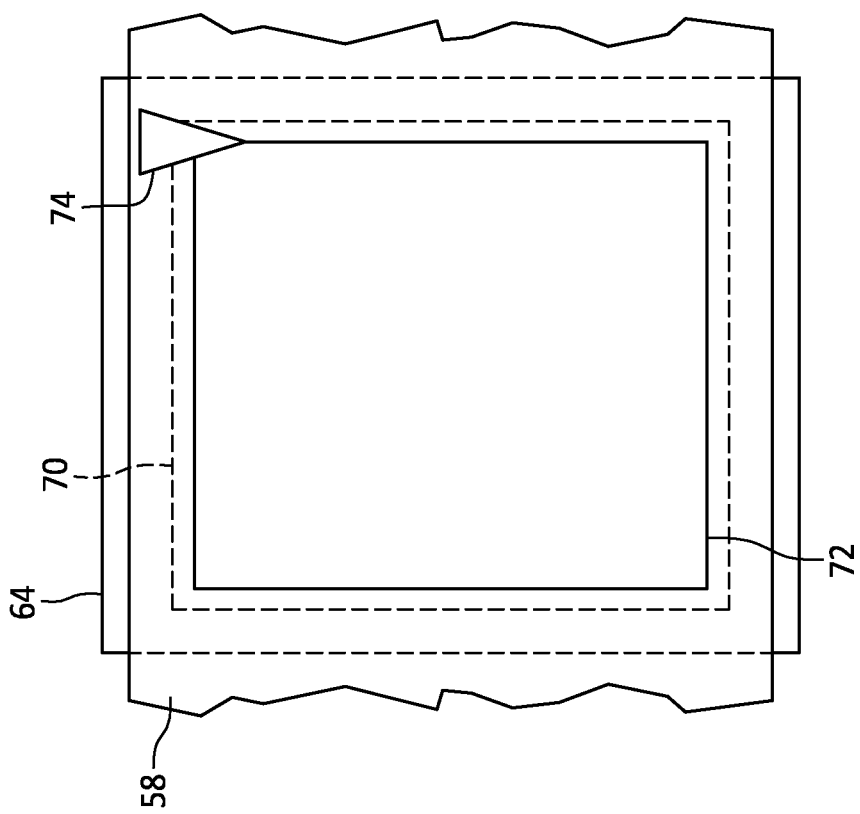
FIG. 8 is a partial plan view schematic illustration of the manufacturing system during formation of a fabric ply.
Figure 9:
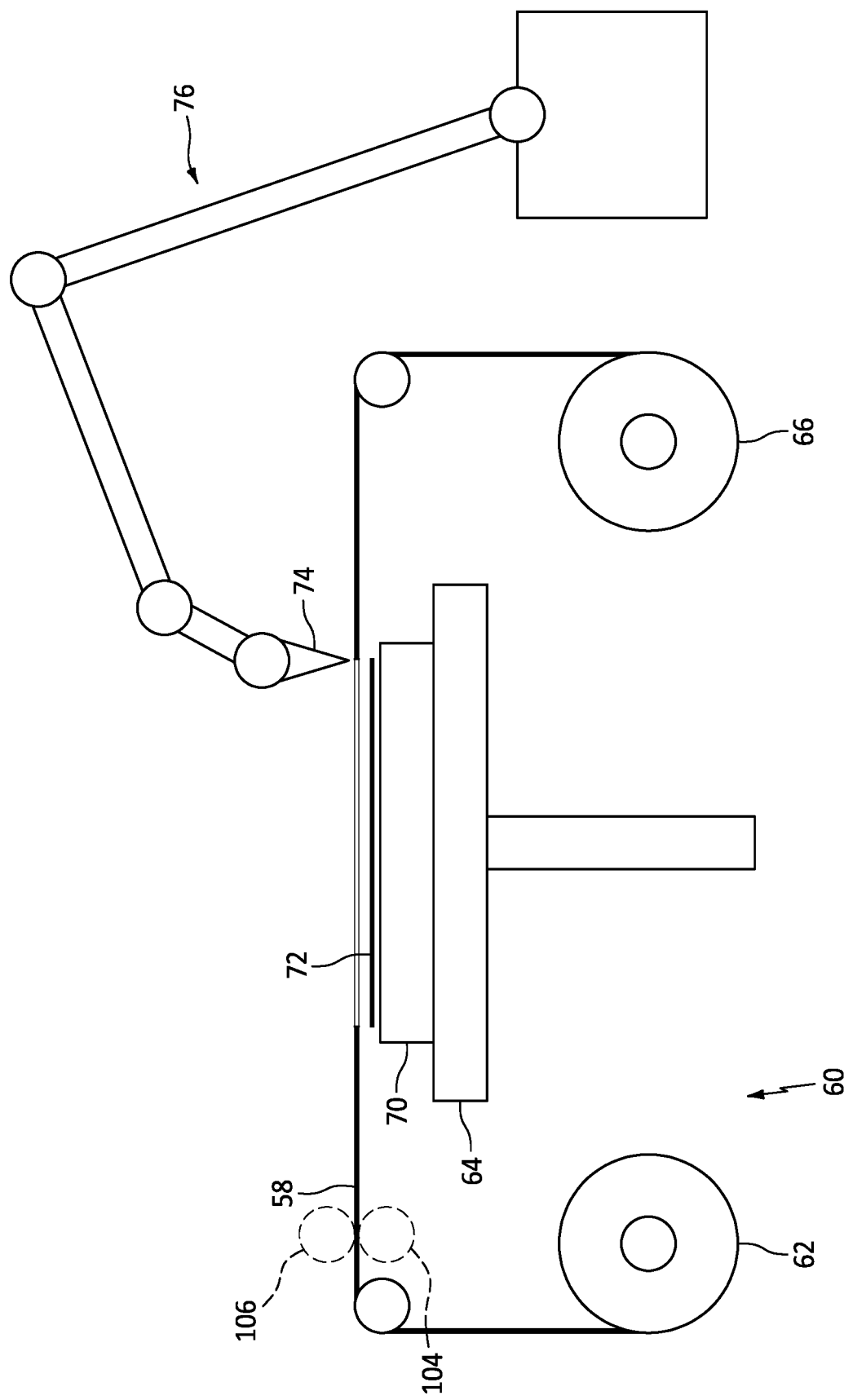
FIG. 9 is a partial schematic illustration of the manufacturing system during formation of the fabric ply.

In step 606, referring to FIG. 8, an initial fabric ply 72 is provided using a cutting tool 74. The cutting tool 74 of FIG. 8, for example, may cut out a (e.g., internal) section of a portion of the fabric 58 disposed over the first tool 70 to form the fabric ply 72. Referring to FIG. 9, upon being cutout, the fabric ply 72 may slightly fall onto and lay against the first tool 70. The cutting may thereby form the fabric ply 72 as well as facilitate disposing the cut fabric ply 72 on the first tool 70. The cutting tool 74 may be configured as a knife (e.g., a blade, an ultrasonic cutting knife, etc.) or an energy beam source (e.g., a laser). This cutting tool 74 may be an end effector attached to and moved by a multi-axis robotic manipulator 76; e.g., a robotic arm.

Figure 10:
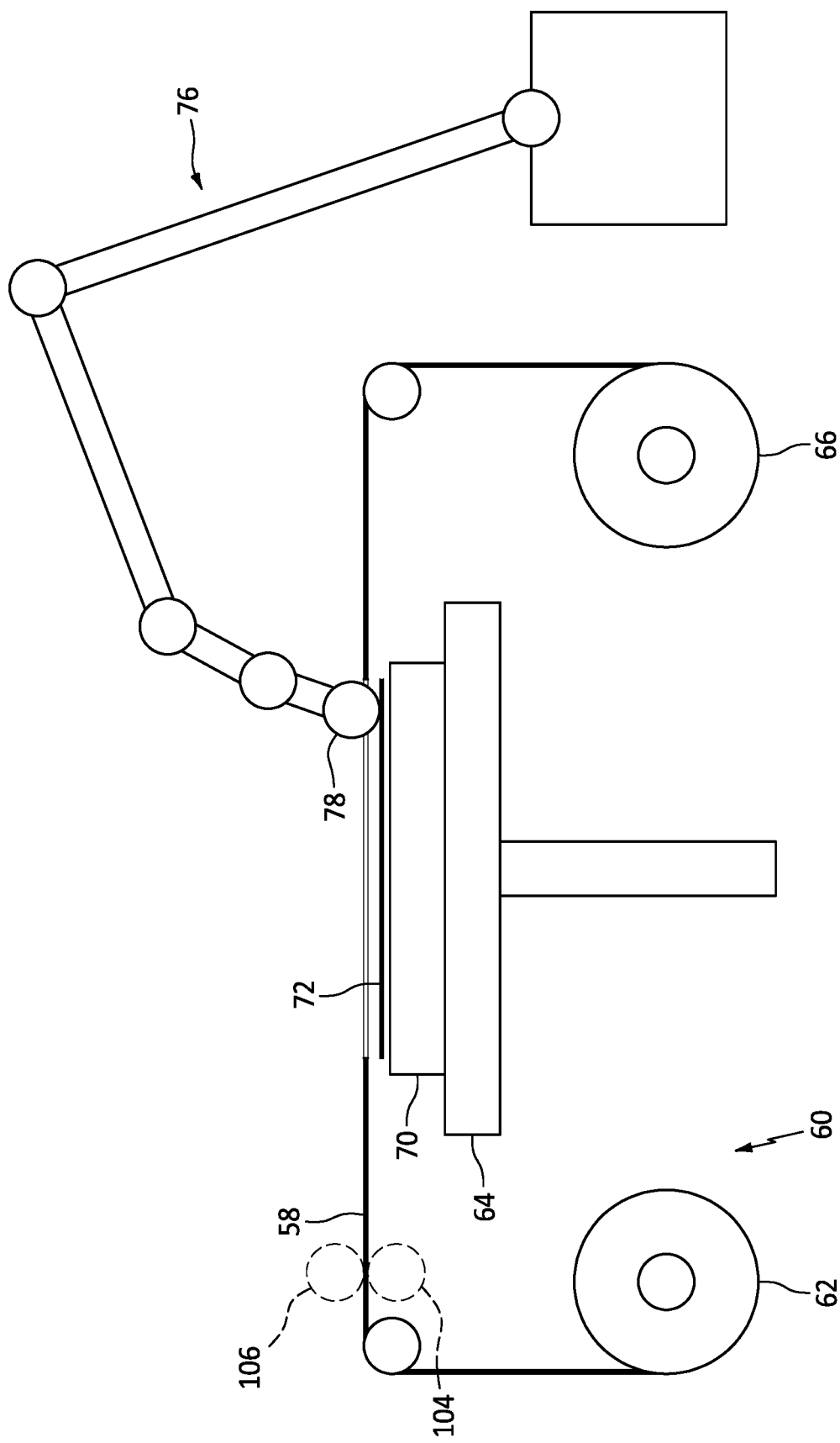
FIG. 10 is a partial schematic illustration of the manufacturing system during pressing of the fabric ply.

In step 608, referring to FIG. 10, the fabric ply 72 is pressed against the first tool 70. A pressing device 78 such as a roller or a shoe, for example, may be pressed against and/or moved along the fabric ply 72 to compress the fabric ply 72 against the first tool 70. This pressing device 78 may be another end effector for the robotic manipulator 76. For example, following the cutting step 606, the robotic manipulator 76 may detach or index from the cutting tool 74 and attach or index to the pressing device 78 for performing the pressing step 608. Alternatively, the robotic manipulator 76 may be configured with an indexing head at an end of the robotic manipulator 76 which (e.g., automatically) indexes into position the a select tool (e.g., a drag knife, a cutting wheel, an ultrasonic knife, a roller, a shoe, a laser, a matrix jetting head, etc.).

Figure 11:
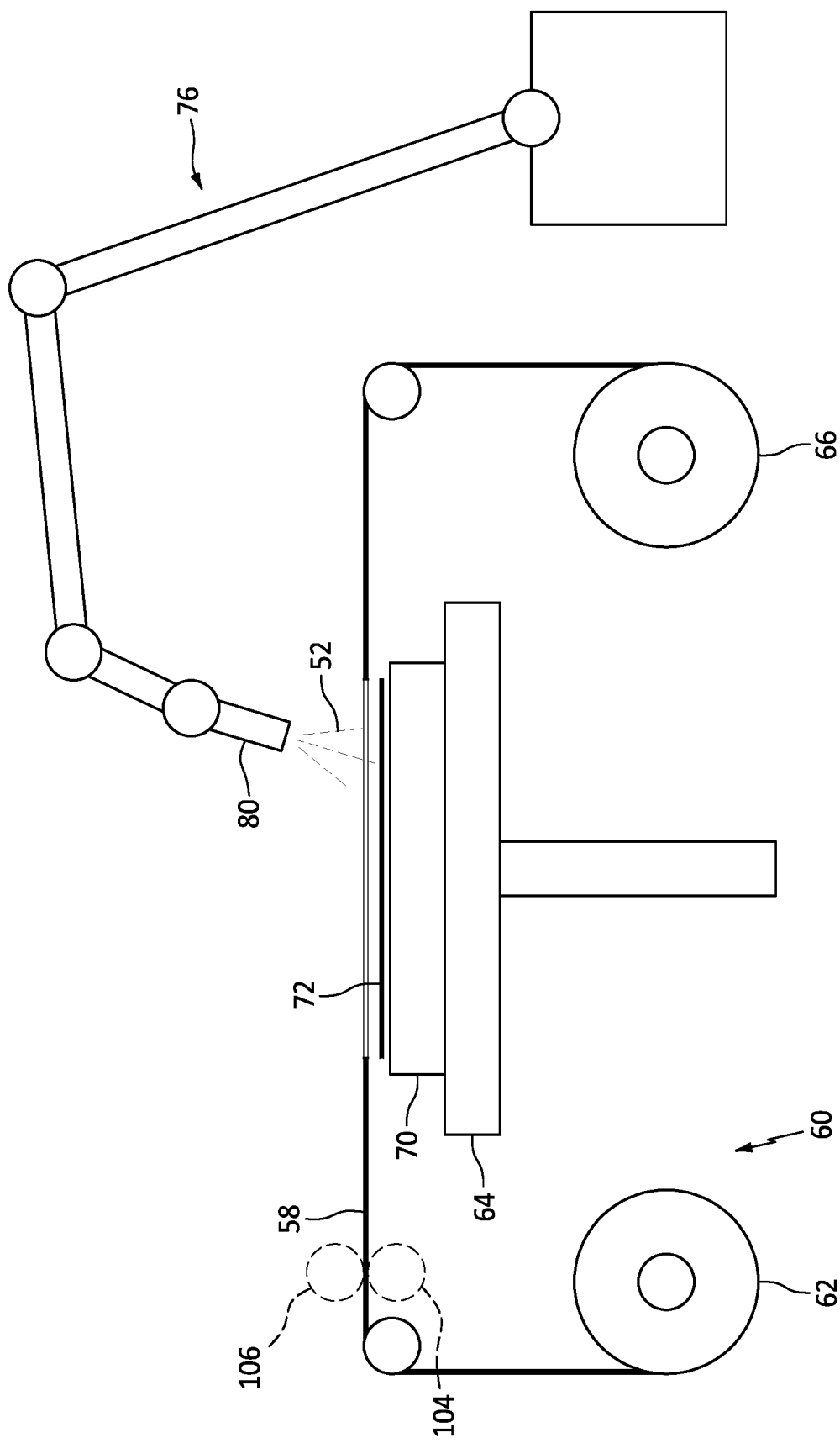
FIG. 11 is a partial schematic illustration of the manufacturing system during application of a polymer matrix.

In step 610, referring to FIG. 11, the fabric ply 72 may be partially or fully impregnated with the polymer matrix 52. A matrix applicator 80 such as a nozzle or a jetting head, for example, may direct the polymer matrix 52 onto the fabric ply 72. This polymer matrix 52 may be applied to wet the fabric ply 72 where the fabric 58 is the dry fabric. The polymer matrix 52 may also be applied to provide additional polymer matrix 52 for subsequent lamination even where the fabric 58 is the prepreg fabric. Of course, it is contemplated this matrix application step 610 may be omitted when the fabric 58 is the prepreg fabric and already includes a suitable amount of the polymer matrix 52 for subsequent lamination. The matrix applicator 80 may be another end effector for the robotic manipulator 76. For example, following the pressing step 608, the robotic manipulator 76 may detach or index from the pressing device 78 and attach or index to the matrix applicator 80 for performing the matrix application step 610.

Figure 12:
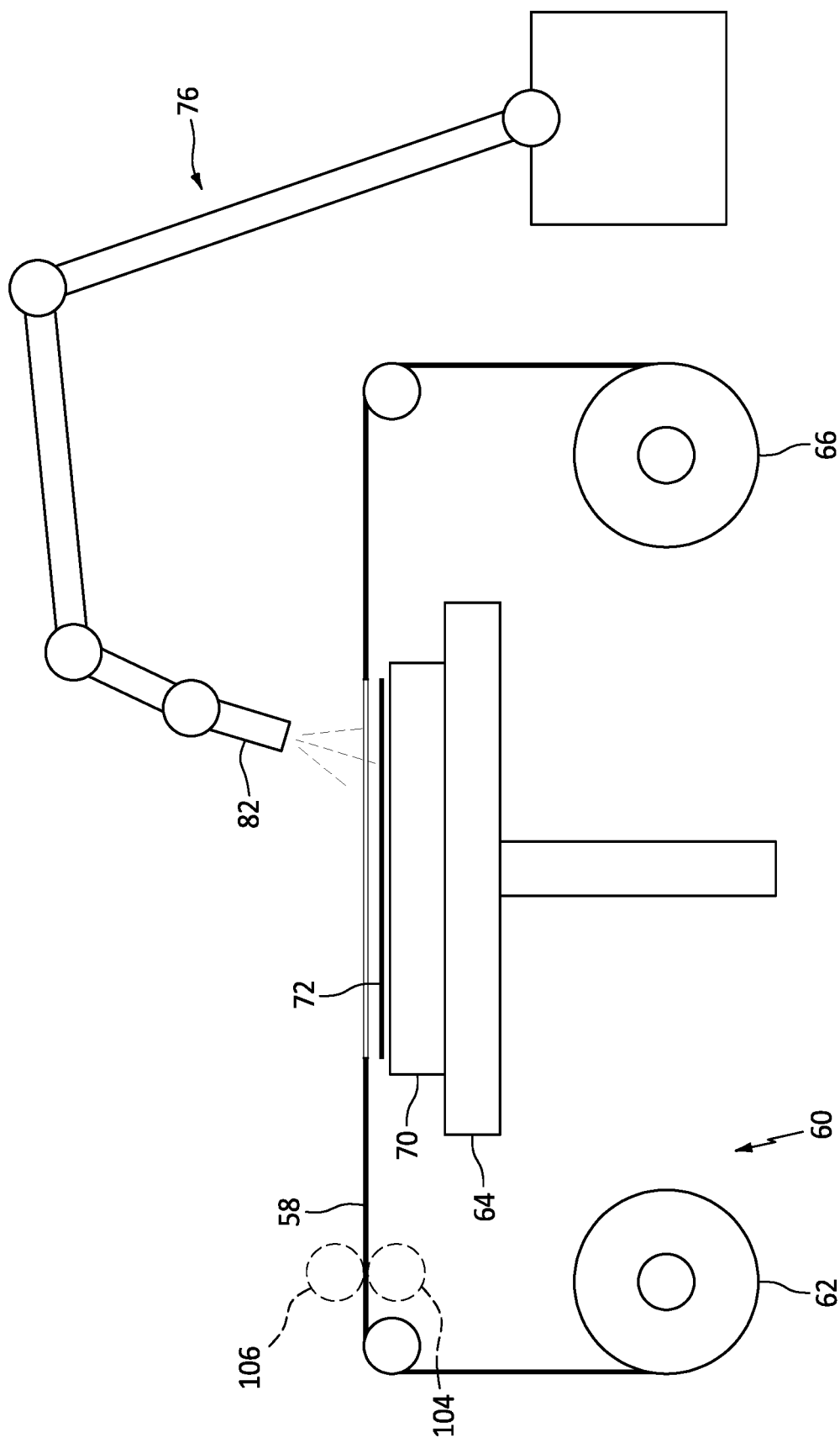
FIG. 12 is a partial schematic illustration of the manufacturing system during curing with UV light.

In step 612, referring to FIG. 12, the polymer matrix 52 may be at least partially (or fully) cured. An ultraviolet (UV) light source 82, for example, may direct ultraviolet radiation onto the polymer matrix 52 to facilitate partial or full matrix curing; e.g., where the polymer matrix 52 is a UV curing matrix. The light source 82 may be another end effector for the robotic manipulator 76. For example, following the matrix application step 610 (or the pressing step 608 where the step 610 is omitted), the robotic manipulator 76 may detach or index from the matrix applicator 80 (or the pressing device 78) and attach or index to the light source 82 for performing the curing step 612. Of course, it is contemplated this ultraviolet light curing step 612 may be omitted when, for example, layer-by-layer curing is not necessary.

Figure 13:
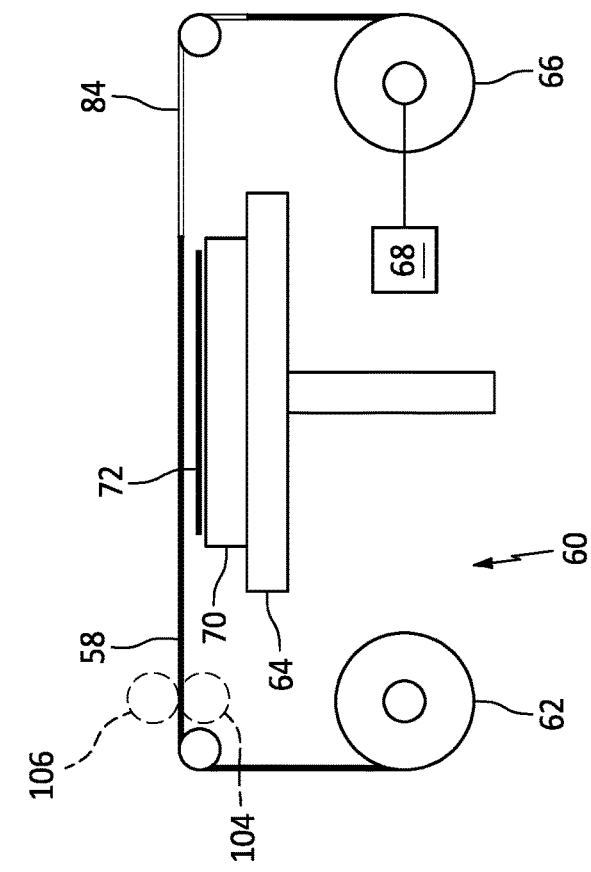
FIG. 13 is a partial schematic illustration of the manufacturing system during pulling of fabric.

In step 614, referring to FIG. 13, another (e.g., uncut) portion of the fabric 58 is arranged over the first tool 70 and the previously formed fabric ply 72. The actuator 68, for example, may rotate the remnant roll 66 to roll up remnants 84 of the fabric 58 following the cutting step 606 onto the remnant roll 66. Here, the rolling up of the fabric 58 onto the remnant roll 66 also pulls the uncut fabric 58 off of the supply roll 62, along the support device 64 and over the first tool 70 as well as the previously formed fabric ply 72. Prior or during this arrangement step 614, the support device 64 may also be lowered to make room for the previously cut fabric ply 72 between the first tool 70 and the next (e.g., uncut) portion of the fabric 58.

Figure 14:
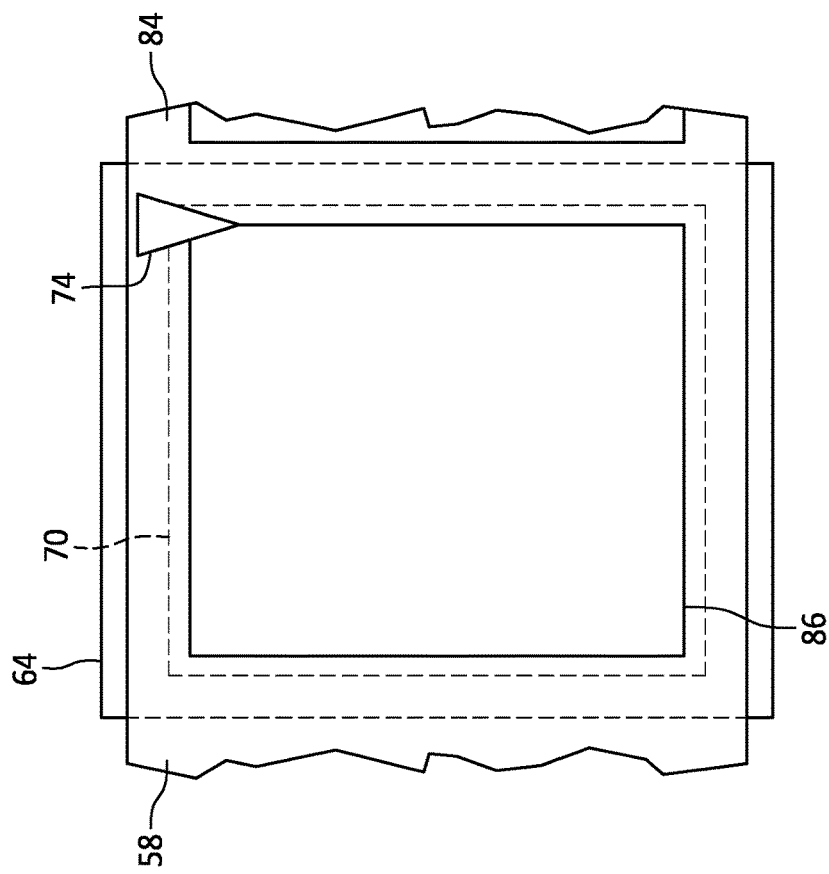
FIG. 14 is a partial plan view schematic illustration of the manufacturing system during formation of another fabric ply.
Figure 15:
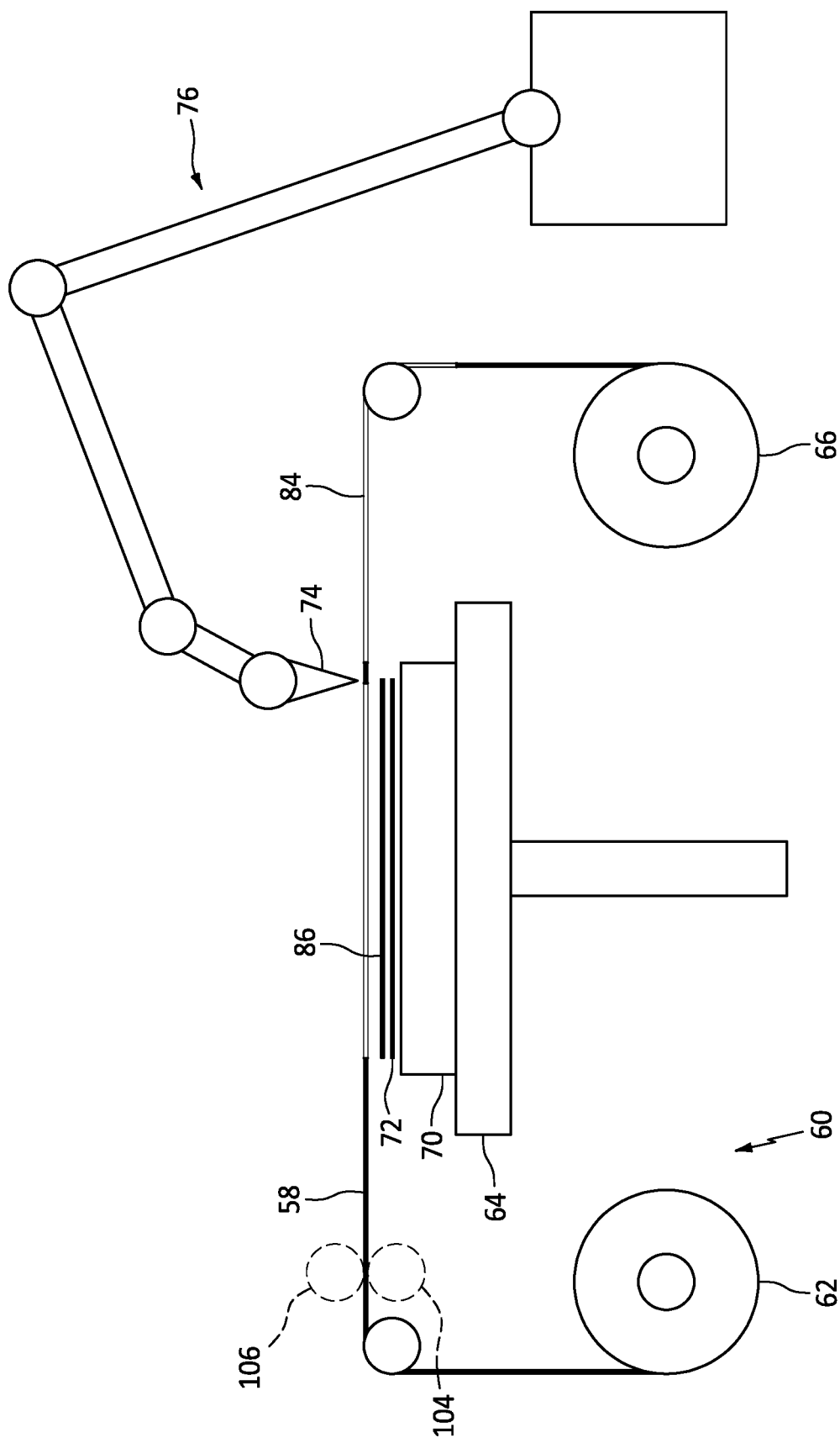
FIG. 15 is a partial schematic illustration of the manufacturing system during formation of the other fabric ply.

In step 616, referring to FIG. 14, another fabric ply 86 is provided using the cutting tool 74. The cutting tool 74 of FIG. 14, for example, may cut out a (e.g., internal) section of another (e.g., uncut) portion of the fabric 58 disposed over the first tool 70 to form the fabric ply 86. Referring to FIG. 15, upon being cutout, the fabric ply 86 may slightly fall onto and lay against the previously formed fabric ply 72/over the first tool 70. The cutting may thereby form the fabric ply 86 as well as facilitate disposing the cut fabric ply 86 on the formed fabric ply 72/over the first tool 70.

In step 618, one or more of the steps 608, 610 and/or 612 may be performed for the fabric ply 86.

In step 620, the steps 616 and 618 may be performed one or more additional times to provide a laminate stack.

Figure 16:
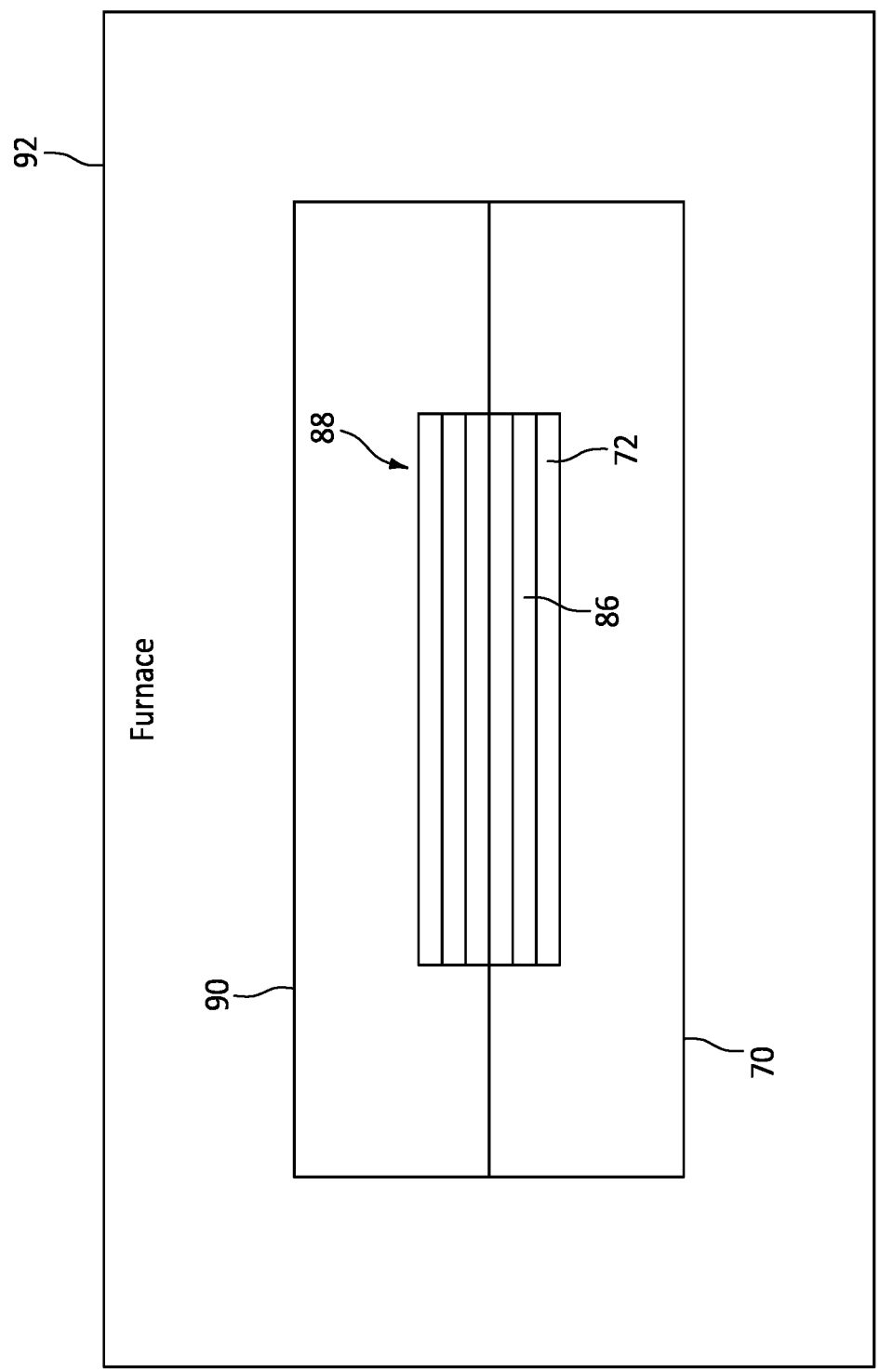
FIG. 16 is a schematic illustration of a laminate stack compressed between tools within a furnace.

In step 622, referring to FIG. 16, the laminate stack 88 is consolidated on the first tool 70. A second tool 90, for example, may be arranged on top of the laminate stack 88 and the first tool 70. This second tool 90 of FIG. 16 is configured as a top mold section; e.g., a top mold half. The robotic manipulator 76 or another device may place the second tool 90 over the laminate stack 88 for mating with the first tool 70. The laminate stack 88 may be pressed between the first tool 70 and the second tool 90, for example, using a mold press. Alternatively, the first tool 70 with the laminate stack 88 may be removed from the support device 64 and vacuum bagged using traditional techniques. The laminate stack 88 may then be heated (e.g., in a furnace 92 such as an autoclave, an oven or other thermal-processing equipment) while under pressure to fuse the impregnated fabric plies (e.g., 72 and 86) together and cure the polymer matrix 52. Following this consolidation step 622, the consolidated laminate stack 88 may form the rotor blade 30, or form a preform of the rotor blade 30 where additional finishing operations are to be performed. Alternatively, the laminate stack 88 may be consolidated after a certain number (e.g., 4-5) of plies have been stacked, and the process can be repeated to form the rotor blade 30 or the preform.

Figure 17:
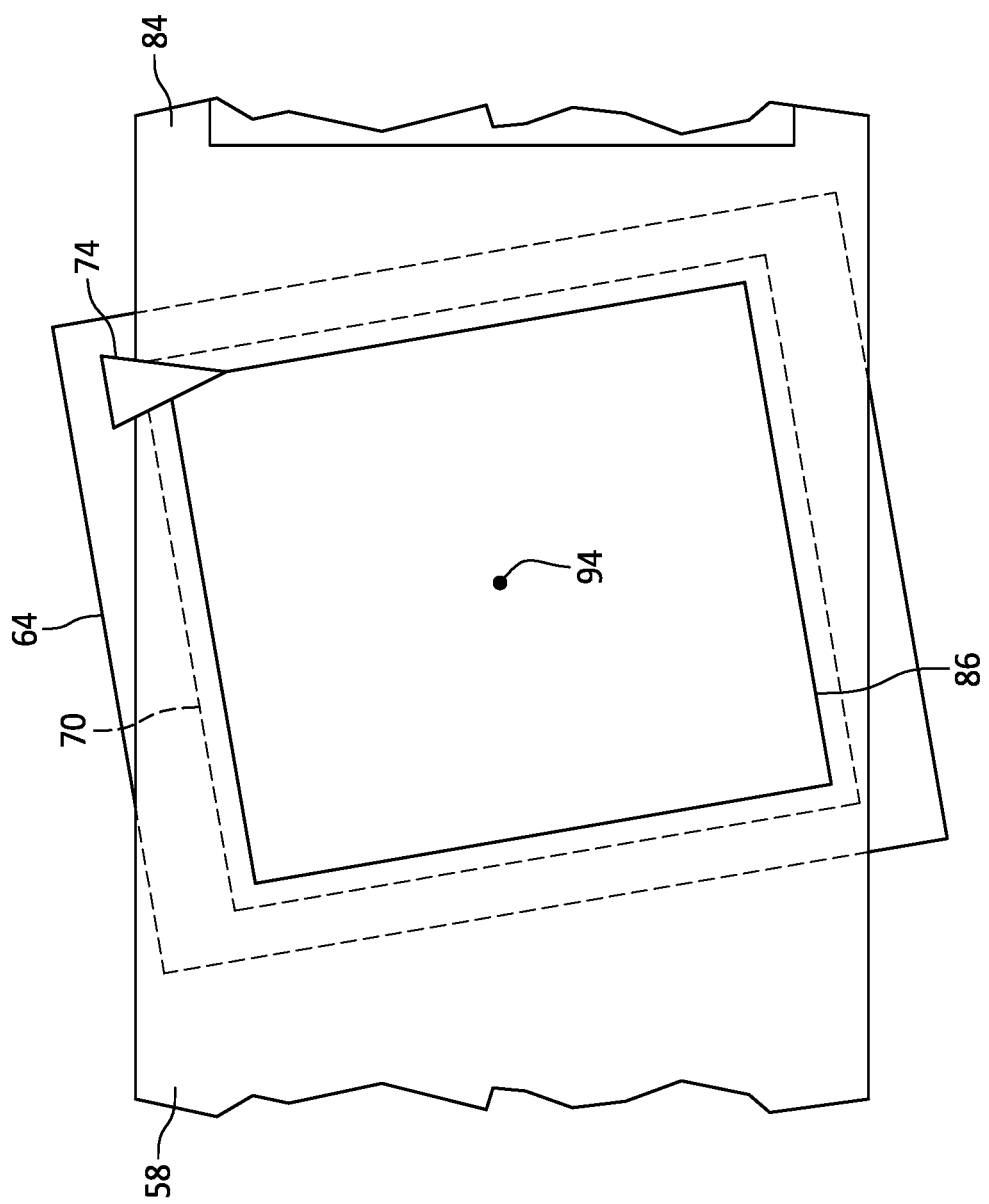
FIG. 17 is a partial plan view schematic illustration of the manufacturing system during reorientation of a tool.

In some embodiments, referring to FIG. 17, the support device 64 may rotate about an axis 94 to reorient the first tool 70 relative to the fabric 58. By reorienting the first tool 70, a direction of the fibers 54 (see FIG. 5) within the fabric 58 may be reoriented relative to the first tool 70. In this manner, fiber orientation may be tailored (e.g., changed or not) on a layer-by-layer basis.

Figure 18:
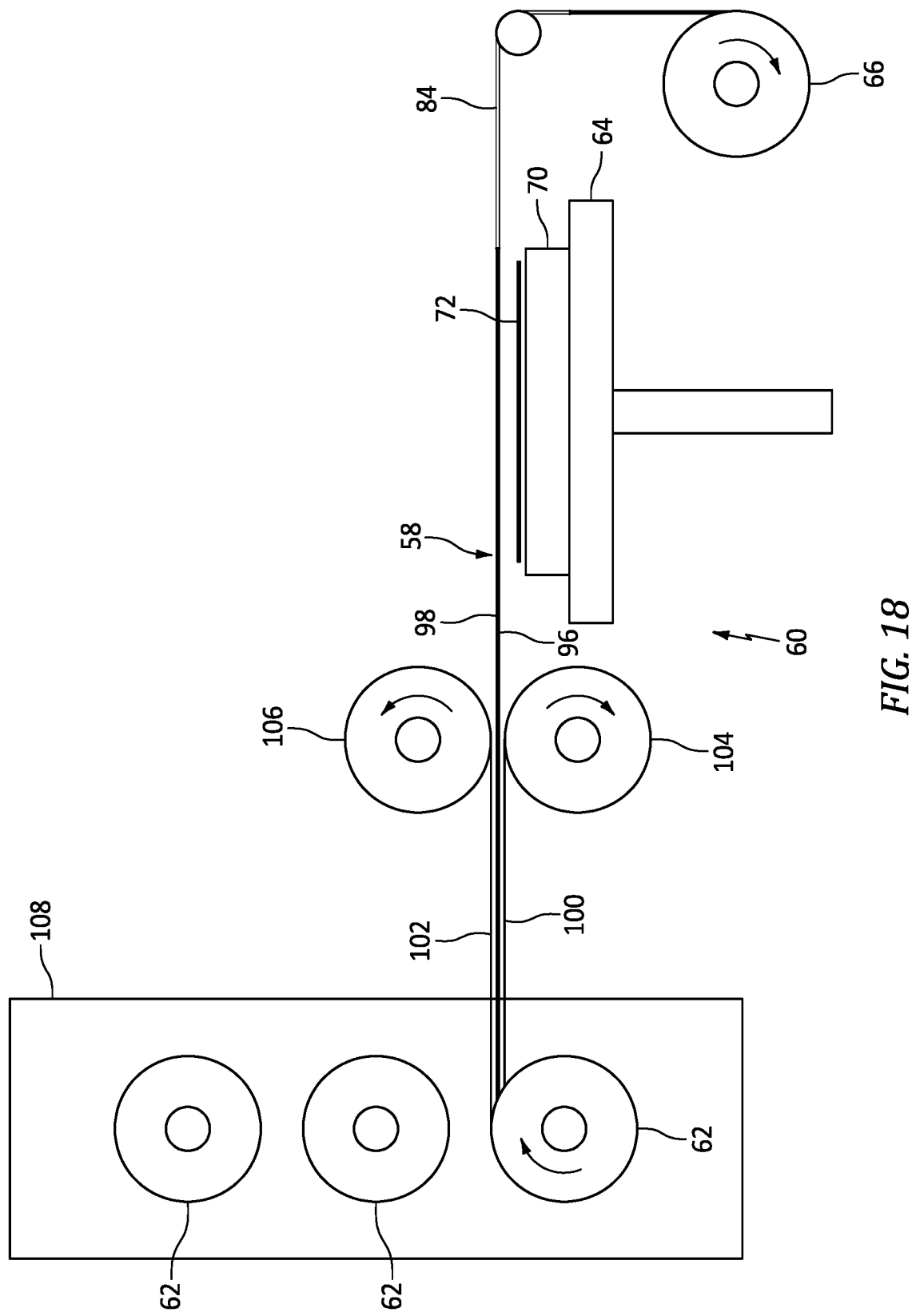
FIG. 18 is a partial schematic illustration of the manufacturing system with a carousel housing multiple fabric supply rolls.

In some embodiments, referring to FIG. 18, one or more surfaces 96 and 98 of the fabric 58 in the supply roll 62 may each be protected by a respective backer 100 and 102. Each backer 100, 102 may be removed from the fabric 58 as it is pulled toward the first tool 70. Each backer 100, 102, for example, may be attached to a backer removal roller 104, 106. Each backer removal roller 104, 106 may be rotated with the rotating of the remnant roll 66 to pull the respective backer 100, 102 off of the fabric 58.

In some embodiments, the supply roll 62 of the fabric 58 may be one of multiple supply rolls 62 available for use in an automated material carousel 108. With such an arrangement, different rolls of fabric may be selected based on the specific composite object being formed. These different rolls of fabric may include different types of fabric materials, different weave patterns and/or different dimensions (e.g., thicknesses, widths, etc.).

Figure 19:
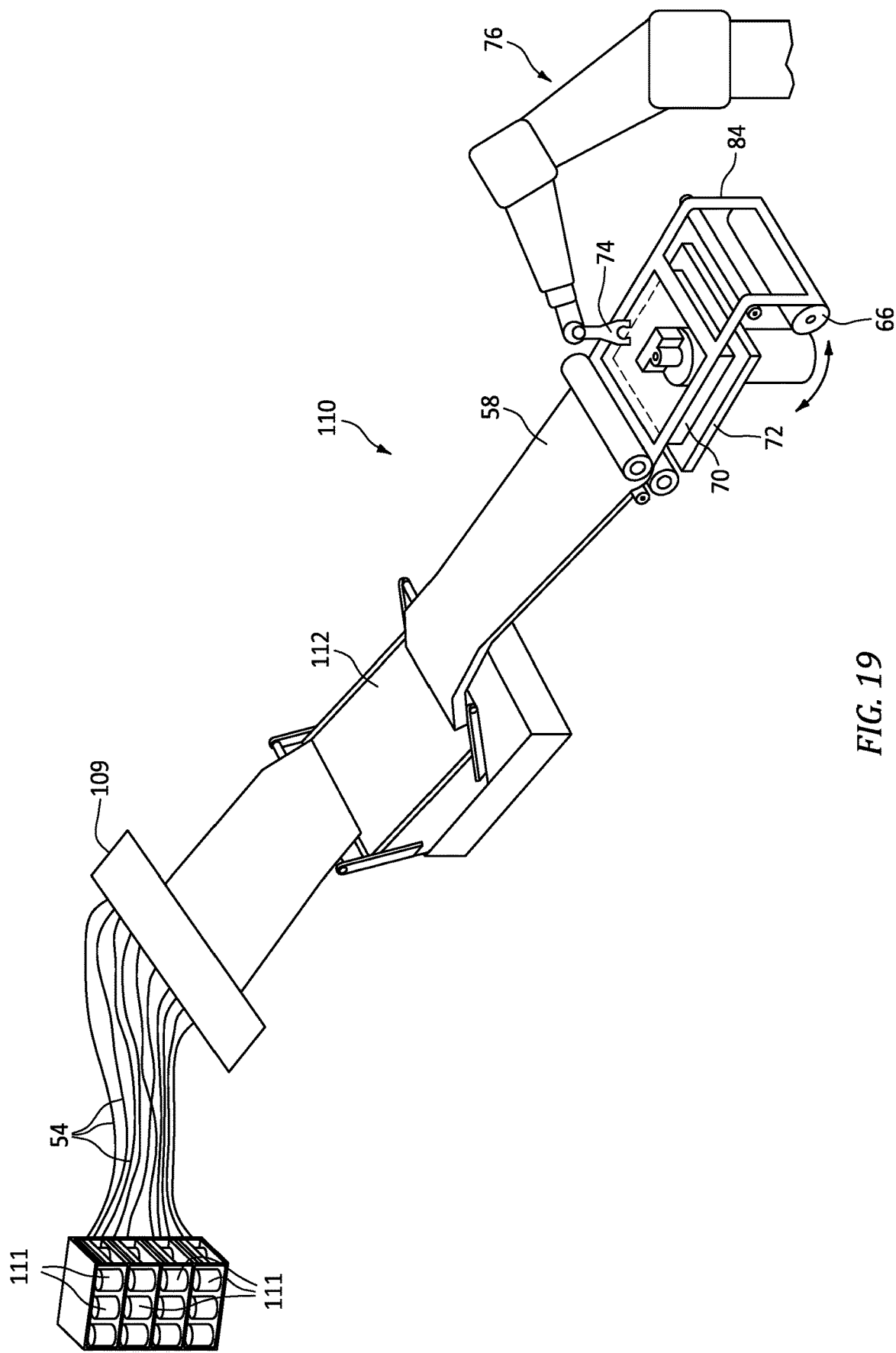
FIG. 19 is partial schematic illustration of the manufacturing system with a loom and a matrix bath.

In some embodiments, referring to FIG. 19, a loom 109 (e.g., a Jacquard loom) may be provided to form the fabric 58 upstream of the first tool 70 along a (e.g., continuous) manufacturing line 110 using lengths of fiber on spools 111. Following weaving of the fibers 54 by the loom 109 to form the fabric 58, the fabric 58 may be dipped into an impregnation bath 112 to partially or fully impregnate the fibers with the polymer matrix 52. This impregnation step may be repeated multiple times to build up adhesive as needed. The impregnated fabric 58 (prepare fabric) may then be manipulated as described above to form the laminate stack. With such an arrangement, each processing step may be automatically performed along a common (the same) manufacturing line 110. This may also reduce the need for cold storage for rolls of prepreg fabric.

Figure 20:
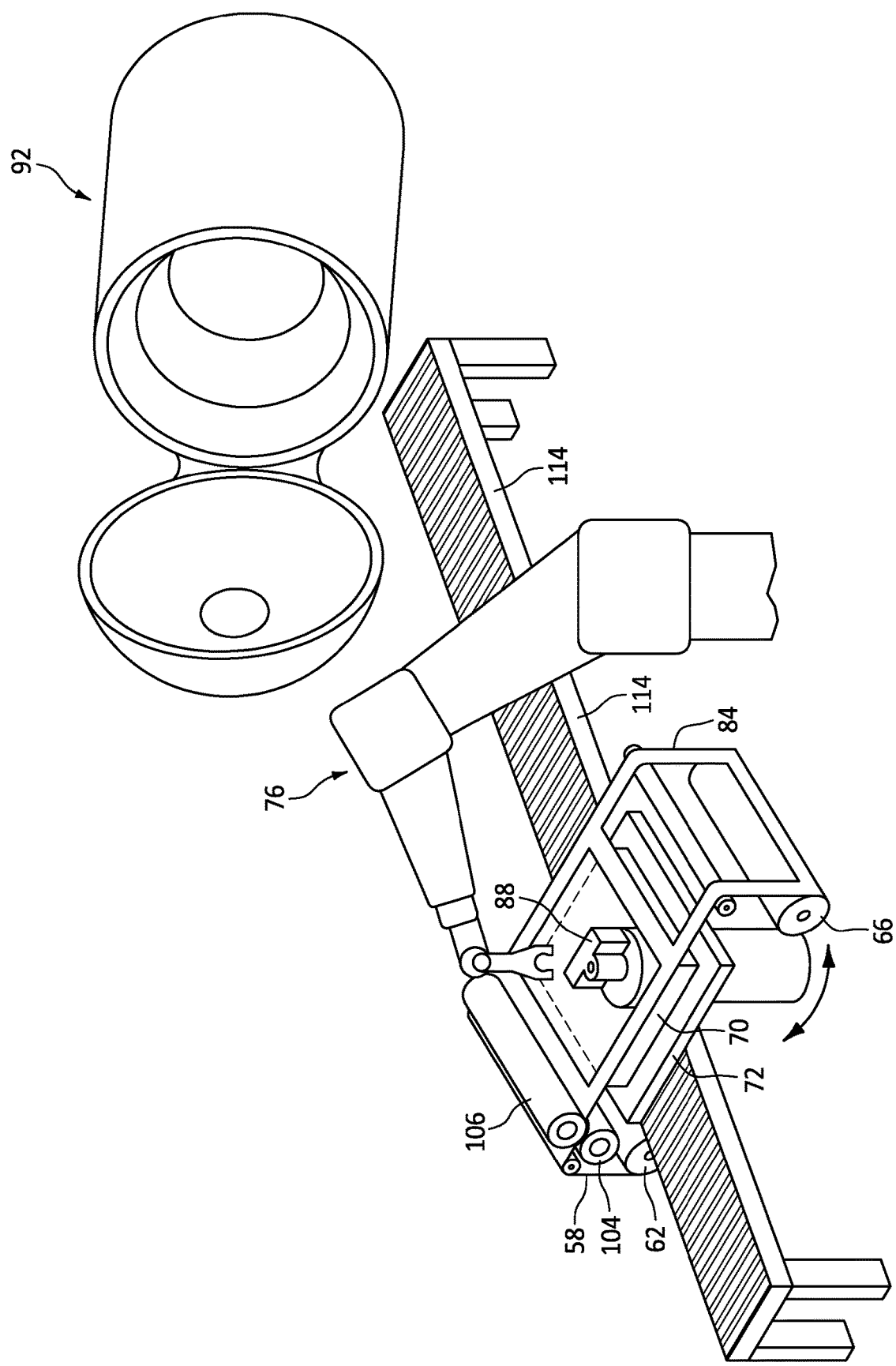
FIG. 20 is a partial schematic illustration of the manufacturing system with multiple conveyors.

In some embodiments, referring to FIG. 20, the manufacturing system may include one or more conveyors 114 for automatically delivering prepared tools 70 to the support device 64 as well as delivering the laminate stack 88 to the furnace 92 (e.g., the autoclave, the oven or the other thermal-processing equipment) for consolidation. Of course, the one or more conveyors 114 may also be added to the manufacturing system of FIG. 18 and/or FIG. 19.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for manufacturing an object, comprising:
   arranging a first portion of a fabric over a tool;
   cutting out a section of the first portion of the fabric to provide a first ply, and disposing the first ply on the tool;
   re-orienting the tool using a support device following the disposing of the first ply on the tool, wherein the support device rotates about an axis to re-orient the tool relative to the fabric;
   arranging a second portion of the fabric over the tool;
   cutting out a section of the second portion of the fabric to provide a second ply, and stacking the second ply on the first ply, wherein the cutting out of the section of the second portion of the fabric is after the re-orienting the tool; and
   consolidating a laminate stack on the tool to form the object, the laminate stack including the first ply, the second ply and a polymer matrix impregnating the first ply and the second ply.

2. The method of claim 1, wherein the section cut out of the first portion of the fabric is an interior section of the first portion of the fabric.

3. The method of claim 1, further comprising
   impregnating the first ply with the polymer matrix following the cutting out of the section of the first portion of the fabric; and
   impregnating the second ply with the polymer matrix following the cutting out of the section of the second portion of the fabric.

4. The method of claim 1, wherein
   the fabric comprises a prepreg fabric; and
   the prepreg fabric includes fiber-reinforcement impregnated with the polymer matrix.

5. The method of claim 1, wherein the polymer matrix comprises a thermoset matrix.

6. The method of claim 1, wherein the polymer matrix comprises a thermoplastic matrix.

7. The method of claim 1, wherein the arranging of the first portion of the fabric comprises pulling the first portion of the fabric over the tool.

8. The method of claim 7, further comprising unrolling the fabric from a roll of the fabric during the pulling the first portion of the fabric over the tool.

9. The method of claim 7, further comprising:
   rolling up a remnant of the fabric during the pulling the first portion of the fabric over the tool;
   the first portion of the fabric located between the remnant of the fabric and the second portion of the fabric.

10. The method of claim 7, further comprising removing a backer from the fabric during the pulling of the first portion of the fabric over the tool.

11. The method of claim 1, further comprising:
    forming the fabric upstream of the tool along a manufacturing line;
    the forming of the fabric comprising weaving fibers together.

12. The method of claim 1, wherein the section of the first portion of the fabric is cut out using a knife attached to a robotic manipulator.

13. The method of claim 1, wherein the section of the first portion of the fabric is cut out using an energy beam.

14. The method of claim 1, further comprising pressing the first ply against the tool.

15. The method of claim 1, further comprising pressing the laminate stack between the tool and a second tool.

16. The method of claim 1, wherein the object is configured as a component for an aircraft.

17. A method for manufacturing an object, comprising:
disposing a first portion of a fabric over a tool;
cutting the first portion of the fabric to leave a first ply of the fabric on the tool;
rotating the tool about an axis using a support device to reorient the tool relative to the fabric after cutting the first portion of the fabric;
disposing a second portion of the fabric over the first ply of the fabric by moving a remnant of the first portion of the fabric following the cutting of the first portion of the fabric;
cutting the second portion of the fabric to leave a second ply of the fabric on the first ply of the fabric; and
consolidating a laminate stack on the tool, the laminate stack including the first ply of the fabric, the second ply of the fabric and a polymer matrix.

18. The method of claim 17, further comprising:
drawing the first portion of the fabric and the second portion of the fabric from a supply roll of the fabric; and
rolling up the remnant of the first portion of the fabric onto a remnant roll of the fabric.

19. A method for manufacturing an object, comprising:
forming a fabric upstream of a tool along a manufacturing line, the forming of the fabric comprising weaving fibers together;
dipping the fabric into an impregnation bath upstream of the tool along the manufacturing line to impregnate at least a portion of the fibers with a polymer matrix;
pulling the fabric over the tool;
cutting the fabric using a robotic manipulator to leave a first ply of the fabric on the tool;
rotating the tool about an axis using a support device to reorient the tool relative to the fabric after cutting the fabric using the robotic manipulator to leave the first ply of the fabric on the tool;
further pulling the fabric over the first ply;
cutting the fabric using the robotic manipulator to leave a second ply of the fabric on the first ply of the fabric; and
consolidating a laminate stack, the laminate stack including the first ply of the fabric, the second ply of the fabric and a polymer matrix.

* * * * *